A. BLACKMAN.
BEARING.
APPLICATION FILED JULY 6, 1918.

1,305,189. Patented May 27, 1919.

Witnesses
George Kuttner

Inventor
A. Blackman
By Victor J. Evans
Attorney

UNITED STATES PATENT OFFICE.

ALEXANDER BLACKMAN, OF NEW ORLEANS, LOUISIANA.

BEARING.

1,305,189.

Specification of Letters Patent.  Patented May 27, 1919.

Application filed July 6, 1918. Serial No. 243,612.

*To all whom it may concern:*

Be it known that I, ALEXANDER BLACKMAN, a citizen of the United States, residing at New Orleans, in the parish of Orleans and State of Louisiana, have invented new and useful Improvements in Bearings, of which the following is a specification.

This invention relates to improvements in bearings and aims to provide a bearing in which the wear will be automatically taken up, thereby obviating the annoyance of loose and uneven bearings and the necessity of manually tightening the same.

To this end the invention embodies a bearing including a stationary bearing section and a movable or floating bearing section, both of which bear directly upon the shaft, the latter section being seated between wedge shaped take up members which are inclined toward one another and tapered so as to tend to force the movable or floating bearing section in a direction toward the shaft when acted upon by springs which bear against the extensions carried by the said floating member and against one end of the wedge shaped take up members.

The invention further includes the following novel construction, combination and arrangement of parts, to be hereinafter more fully described and illustrated in the accompanying drawings, in which:—

Figure 1:
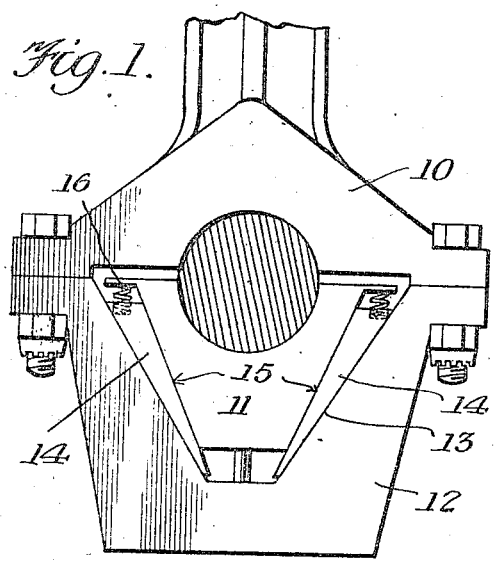
Figure 1 is a side elevation of a bearing constructed in accordance with the present invention.
Figure 2:
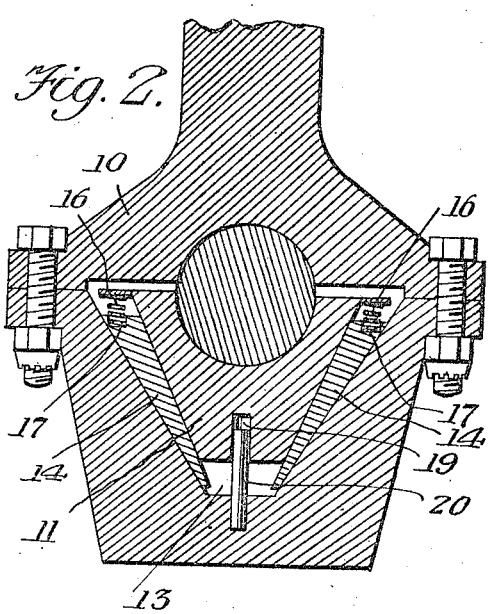
Fig. 2 is a vertical sectional view of the same.
Figure 3:
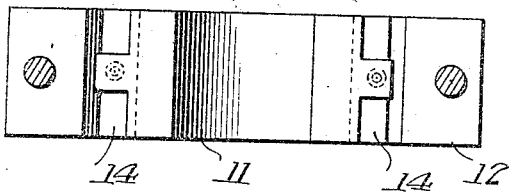
Fig. 3 is a horizontal sectional view.

Referring to the drawings in detail the bearing includes a stationary bearing section 10 and a movable or floating bearing section 11, the latter being contained within a suitable housing or support 12, which may be a portion of the crank case or an engine or other mechanism, while the stationary bearing section 10 may be the cap for the said bearing.

The portion 12 is formed of a substantially V-shaped opening 13 and within this opening is seated the movable section 11 and interposed between this section and the walls of the opening 13 are wedge shaped take up members 14. The movable section 11 is formed with inclined sides 15, the angle of which however is sharper than the inclined sides of the V-shaped opening 13 and the wedge shaped take up members 14 are adapted to be fitted to the space provided between the walls 13 and 15. It will be apparent therefore that by forcing the wedge shaped take up members 14 downward, the member 11 will be forced in an opposite direction so as to keep the latter in contact with the shaft of the bearing.

In order that the wedge shaped members 14 may be forced downwardly to accomplish the lifting of the movable member 11, springs 16 are seated within sockets 17 provided in the widened ends of each of the members 14, these springs projecting upwardly and bearing against plate projections 18 projecting from each side of the movable bearing section 11.

If desired the bearing section 11 may be provided with a central opening 19, and a pin 20 may be extended upward within the bottom of the V-shaped opening 13 of the portion 12 for entrance into the opening 19 to act as a guide for the section 11.

Figure 4:
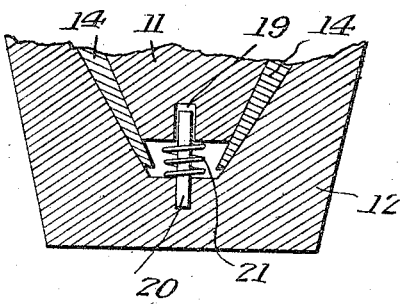
Fig. 4 is a fragmentary sectional view illustrating a modified form of the invention.

To further insure the take up of the bearing, a spring 21 may surround the pin 20 between the lower end of the section 11 and the bottom of the V-shaped opening 13 as shown in Fig. 4.

The invention is susceptible of other changes in its form, proportions and minor details of construction and the right is reserved to make such changes.

Having described the invention, what is claimed is:—

1. A bearing including a stationary bearing section, a movable bearing section having inclined sides, take up members bearing against the inclined sides of the movable section to force the latter toward the shaft and means including a pin carried by the stationary section and slidably engaging the movable section for holding the latter section and the take up members against lateral movement.

2. A bearing including a stationary bearing section, a movable bearing section, oppositely extending inclined sides formed on the movable section, wedge shaped take up members bearing against the inclined side of the movable section, springs bearing against the wedge shaped take up members and extensions of the movable bearing member for forcing the latter toward the shaft and means for holding the movable bearing section and take up members against lateral movement.

In testimony whereof I affix my signature.

ALEXANDER BLACKMAN.